A. BÖHMER.
DEVICE FOR CONTROLLING ELECTRICALLY DRIVEN STAGES, LIFTS, AND THE LIKE.
APPLICATION FILED FEB. 21, 1908.

916,259.

Patented Mar. 23, 1909.
4 SHEETS—SHEET 1.

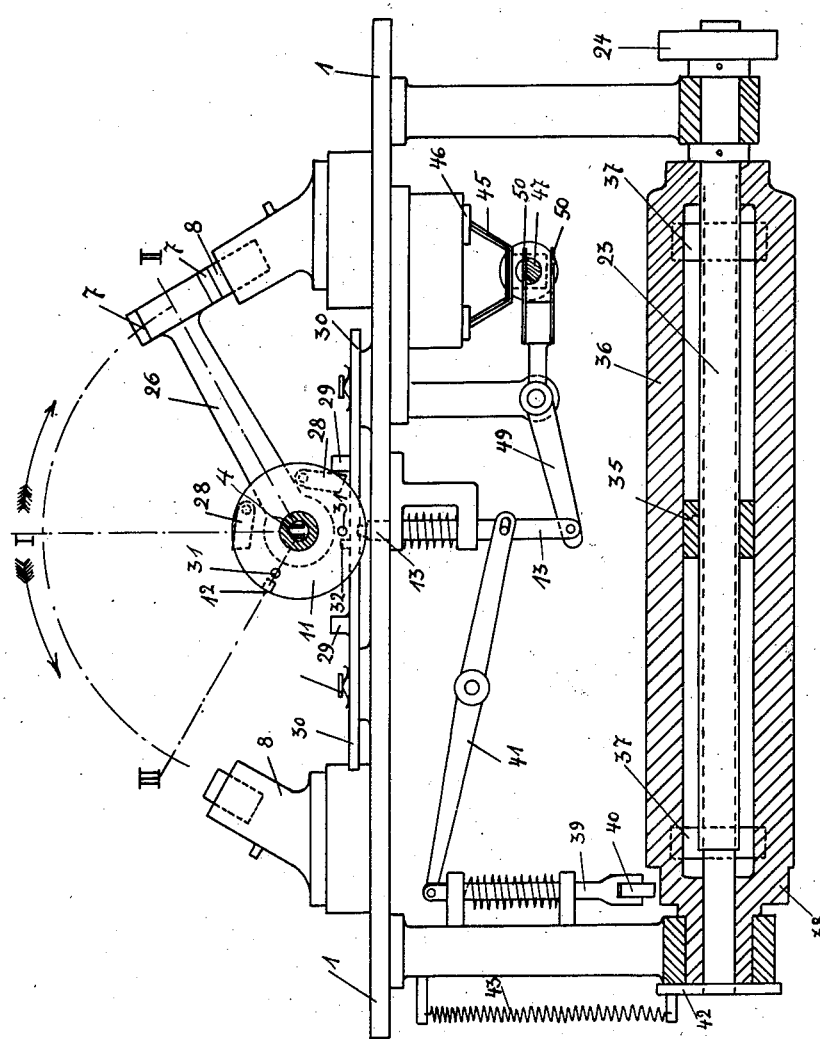

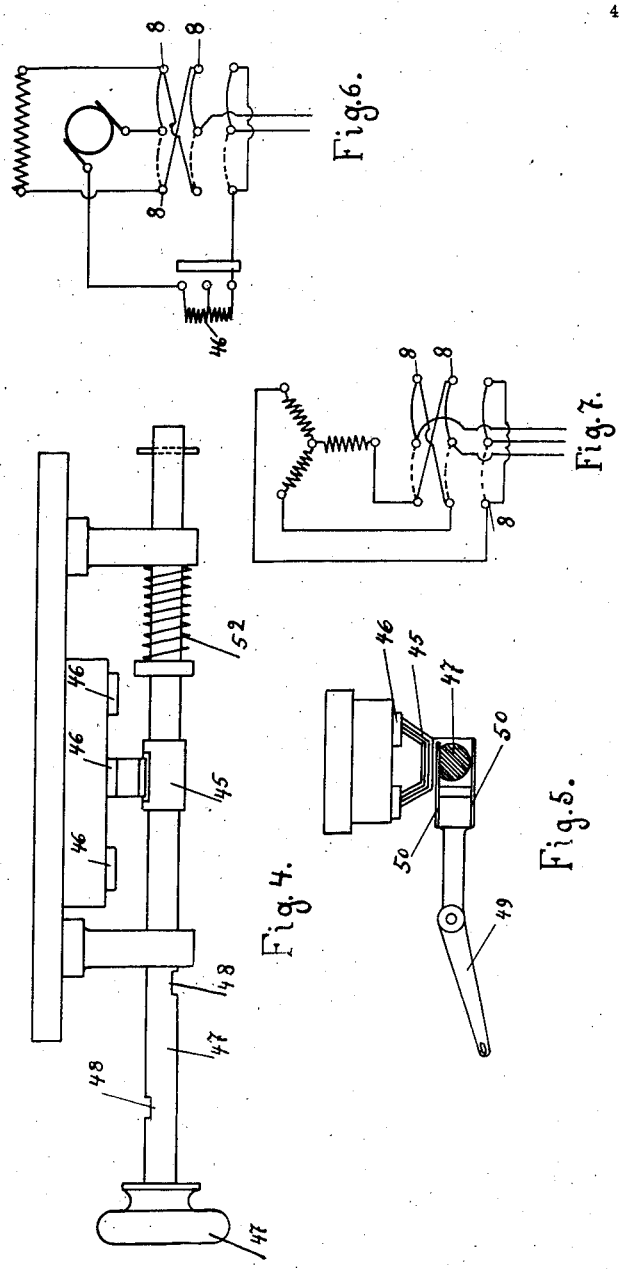

UNITED STATES PATENT OFFICE.

AUGUST BÖHMER, OF MAGDEBURG, GERMANY.

DEVICE FOR CONTROLLING ELECTRICALLY-DRIVEN STAGES, LIFTS, AND THE LIKE.

No. 916,259.　　　　Specification of Letters Patent.　　Patented March 23, 1909.

Application filed February 21, 1908. Serial No. 417,058.

*To all whom it may concern:*

Be it known that I, AUGUST BÖHMER, manufacturer, a subject of the King of Prussia, German Emperor, residing at No. 9 Insleberstrasse, Magdeburg, in the Kingdom of Prussia, German Empire, have invented certain new and useful Improvements in Devices for Controlling Electrically - Driven Stages, Lifts, and the Like, of which the following is a specification, reference being had therein to the accompanying drawing.

The subject-matter of the present invention is a method and device by which the travel of electrically operated stages on carriages, the cages of hoists, or the like, is to be automatically limited, so that the electric circuit is broken and the stage or the like is fixed in every desired previously determined position as to height, without action on the part of the attendant.

In accordance with the invention the switch for the main conductor is operated directly, and in accordance with the new method in such a manner that the switch is held in the closed position, in which it is placed against the action of a spring, by a detent or stop, until the latter is released in the end position of the stage by a controlling means operated from the driving motor, so that the spring-pressed switch returns into its commencing position.

The device may be employed for continuous current as well as for polyphase current; in the former case a starting resistance may be inserted in addition; this is preferably connected with the switch and inserted again automatically after the circuit is broken.

The stop is released by a traveling nut which in its end positions corresponding to those of the stage moves mechanism directly connected with the locking device of the main switch, so that this stop is operated and not the switch. The arrangement of special releasing gear independent of the carriage and operated directly by the motor has the advantage that the motor can be cut out of circuit and stoped in a short space of time.

In order that the invention may be clearly understood, reference is made to the accompanying drawing in which embodiments are represented by way of example and in which:—

Figure 1:
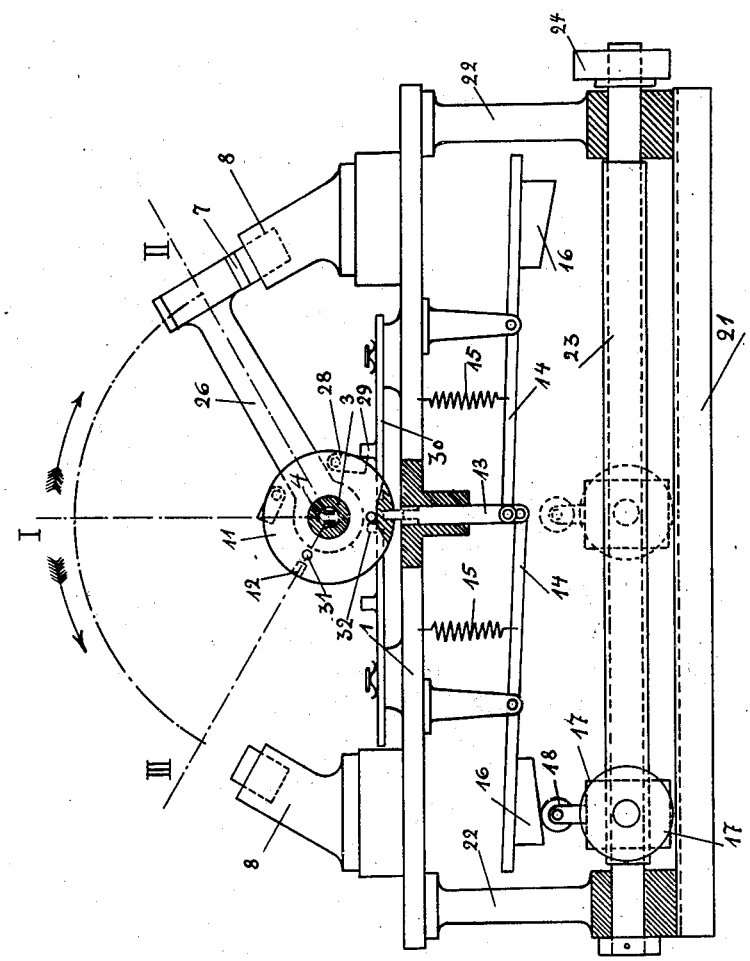
Figure 2:
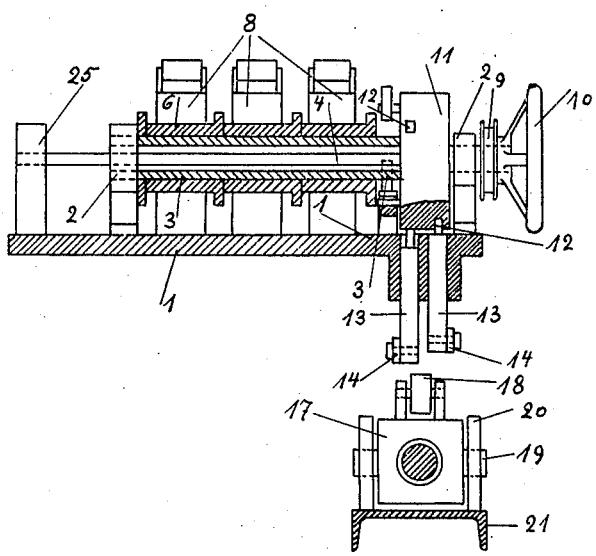

Figure 1 is an elevation partly in section showing the device with two uncoupling levers, and Fig. 2 is a transverse section through the same. Fig. 3 is an elevation of a modified form, and Figs. 4 and 5 are an elevation and cross-section respectively of an auxiliary switch of the starting resistance for continuous current, whereas Figs. 6 and 7 are diagrams of connections for continuous and polyphase current respectively.

Referring to the drawing, on the base-plate 1 there are attached all the parts of the device, so that the latter forms a whole closed in itself which can be built in independently of the carriage. The base-plate carries pedestals 2 in which there rests the hollow switch-shaft 3, in the hollow of which flat torsion springs 4 are arranged. On said shaft there are situated insulation bushings 6 for the switch-levers 26 which are formed T-shaped in the front part and carry contacts 7; the latter lie on the contact-shoes 8 which are on, but insulated from, the base-plate. A pair of shoes 8 belongs to each of the three switch-levers. A brake-disk 9 and the hand-wheel 10 are arranged at the front end of the shaft; behind the front pedestal there is situated a locking-disk 11 provided with two notches 12 into which two pins 13 can alternately snap. In order to enable this, the two notches 12 are displaced with respect to one another both in the direction of the periphery of the disk and also the breadth, so that whenever the disk rotates always only one notch becomes connected with the appertaining pin. At the lower ends of the pins there are attached two two-armed disconnecting levers 14 which must always return into their commencing positions on account of the tension of the springs 15. The ends of these levers carry beveled noses 16 against which a wheel 18 on the switch-nut 17 runs, whereby the levers are rocked. The nut 17 has on both sides pivots 19 on which pulleys 20 can rotate, and the latter, on their part, run on the guide 21 which is formed, for example, of U-shaped iron. The guide 21 is attached to the pedestals 22 of the spindle 23, the latter being rotated by the pulley 24 from the electric motor. The end of the springs 4 is attached in a rectangular piece 25; the latter, on its part again, rests in a corresponding cavity in the base-plate, so that the end of the springs does not participate in the rotation.

In order to prevent the current being repeatedly switched on in the same direction, a safety device is provided consisting of a spring-pressed slide 30 which carries a small central lug 32 and two large lateral noses 29.

Against the central lug there lie pins 31 situated on the locking disk 11. On the latter there are also pawls 28 which can lie on the noses 29. The employment of the disconnecting levers enables the switch-nut to be moved beyond the end position.

The device operates in the following manner:—In the disconnected position of the stage, the switch-lever is in the position I. If the stage is to be moved upward, for example, by rotating the hand-wheel 10, the switch-lever 26 is brought into the circuit-closing position II in which one of the two pins 13 snaps into the appertaining notch 12, so that the switch-lever now remains in the position in which the circuit is closed. At the same time the nut 17 begins to travel to the right-hand for example, and at last contacts the nose 16 whereby the lock is released, and the lever 14 is rotated against the tension of its spring 15 and lever 26 returns into its commencing position. Now if the current is to be switched on again, this is not possible in the same direction, since the pawl 28 would have previously fallen on the nose 29 of the safety-slide 30. The switch must therefore be rotated in the opposite direction, so that it comes into position III. In this case the one pin 31 which is on the disk 11 lies against the axle 32 of the safety-slide 30, and brings the same into its extreme right-hand position. At the moment when the circuit is closed, the second releasing pin 13 which has hitherto been lying on the periphery of the disk 11, snaps into its groove 12 and locks the switch, while the nut 17 moves toward the other end, so that the previously described operation is again repeated in the end position.

The device represented in Fig. 3 consists of a nut 35 which likewise runs on a spindle 23 driven by the motor. The nut rests in a guide 36 revoluble around the spindle 23, and this guide carries stops 37 for the end positions of the nut. The end of the guide-frame is formed as an eccentric 38 on which there runs a pulley 40 journaled in a pin 39. Further, this pulley is connected by a lever 41 with the spring-pressed releasing-pin 13. At the end of the frame 36 there is arranged a disk 42 which serves for holding the one end of a spring 43; the latter brings the guide 36 constantly into the position in which its eccentric part, farthest removed from the center is situated below. In this position the detent pin 13 jumps into the locking-disk 11. In this form of the device the main switch 26 is uncoupled by the nut 35 hitting against the stop 37 at the end of its movement. At this moment it is thus prevented from moving farther, and the frame 36 is therefore rotated against the tension of the spring 43. The part of the eccentric farthest from the center then moves upward, the pin 39 is raised and the detent pin 13 lowered, so that the switch is liberated. The spring 43 simultaneously returns the frame again into its normal position.

When continuous current is employed, it is necessary in addition when starting the motor to cut out resistances successively from the circuit. In order to effect this at the suitable moment in the present device, a variable resistance is connected with the releasing pin 13, this resistance being so constructed that it can be operated only in definite positions of the main switch, as the carriage must generally be attended by unskilled workmen. For switching resistance out of circuit, a contact-slide 45 is employed which is moved over the contacts 46. The slide is on an insulated rod 47 which has a notch 48 both on its upper and lower side, these notches being arranged displaced relatively to one another in a horizontal direction. With the releasing pin 13 there is also connected a two-armed lever 49 provided at its free end with two leaf-springs 50 which clasp the rod 47 in such a manner that one of them can always engage in its appertaining notch. In the normal position in which the detent pin 13 occupies its lowest position, the lower spring 50 engages in the lower notch 48; in this case all the resistances are connected in circuit. It is then not possible to push rod 47 inward; to do so the spring would have to be broken off by force. If current is switched on, on the contrary, and the detent-pin 13 has arrived in its highest position, the lower spring leaves its groove, whereas the upper lies on the rod 47. The latter can now be pushed longitudinally against the tension of the spring 52 and accordingly the resistances can be cut out of circuit. In the end position the upper spring 50 snaps into its appertaining groove and locks the slide. If the movement of the stage has finished, the detent pin 13 returns into its normal position, so that the upper spring also releases the rod 47 and the latter automatically returns into its commencing position in consequence of the pressure of the spring 52.

Fig. 6 is a diagram of connections for continuous current, and Fig. 7 shows that for polyphase current. The characteristic feature in these connections is that the second and third contacts are connected cross-wise, so that by simply reversing the switch, the circuit is also reversed. The two front contacts are connected with one another. In the case of continuous current the one pole of the motor is connected to one of these contacts, a starting resistance 46 being inserted between the motor and the contact, whereas the shunt is connected to the two rear contacts 8.

What I claim as my invention and desire to secure by Letters Patent is:—

1. In a device for automatically controlling the movement of electrically driven stages on carriages, or hoisting-devices the combination of a mechanically operated lock adapted to be released by a regulator operated in the end positions of the stage by the driving motor, with a spring-pressed switch held in a closed position by means of said lock, returning automatically to its open position when released from the same lock, and having means to automatically prevent it from returning into the same closed position.

2. In a device of the type described, the combination of a base-plate, a shaft carrying a switch-lever fastened thereto, a spring tending to keep said switch-lever in its open position, a disk having notches fixed on said shaft, one or more spring-pressed detents against said disk adapted to engage in said notches and hold the disk in a plurality of closed positions of the switch-lever, and disconnecting means adapted to be actuated by an electric motor for withdrawing said detents from said notches, whereby the switch-lever returns automatically to its open position.

3. In a device of the type described, the combination of a base-plate, a shaft carrying a switch-lever fastened thereto, a spring tending to keep said switch-lever in its open position, a disk having notches fixed on said shaft, one or more spring-pressed detents against said disk adapted to engage in said notches and hold the disk in two closed positions of the switch-lever, pedestals on said base-plate, a screwed spindle carrying a pulley revoluble in said pedestals, a nut carrying a wheel on said spindle, and two levers each carrying a nose at one end and connected at the other end with one of said detents, said noses being adapted to be engaged by said wheel.

4. In a device of the type described, the combination of a base-plate, a shaft carrying a switch-lever fastened thereto, a spring tending to keep said switch-lever in its open position, a disk having notches fixed on said shaft, a spring-pressed detent against said disk adapted to engage in one of said notches and hold the disk in a closed position of the switch-lever, disconnecting means adapted to be actuated by an electric motor for withdrawing said detent from said notches whereupon the switch-lever returns automatically to its open position, pins on said disk, pawls on said disk, and a slide on said base-plate, said slide having a central lug and a nose at each side thereof, said lug being adapted to be contacted by said pins and each nose being adapted to be contacted by and to hold one of said pawls.

5. In a device of the type described, the combination with a base-plate, and a shaft carrying a switch-lever fastened thereto, of a disk having two notches fixed on said shaft, two pins on said disk, two pawls on said disk, and a slide on said base-plate, said slide having a central lug and a nose at each side thereof, substantially as shown for the purpose specified.

In witness whereof I have hereunto set my hand in presence of two witnesses.

AUGUST BÖHMER.

Witnesses:
JOHANNA GRUNOW,
HANS EYCK.